United States Patent [19]

Yowell et al.

[11] Patent Number: 5,507,466
[45] Date of Patent: Apr. 16, 1996

[54] VOLUMETRIC HYDRAULIC FUSE VALVE

[75] Inventors: Gordon Yowell; Duane Samuelson, both of Boca Raton, all of Fla.

[73] Assignee: Predator Systems Inc., Boca Raton, Fla.

[21] Appl. No.: 293,033

[22] Filed: Aug. 19, 1994

[51] Int. Cl.⁶ ............................................. F16K 21/16
[52] U.S. Cl. ................................... 251/16; 137/271
[58] Field of Search ................... 251/15, 16, 20, 251/23; 137/599.2, 271

[56] References Cited

U.S. PATENT DOCUMENTS

| | | | |
|---|---|---|---|
| 2,254,253 | 9/1941 | Williams | 251/16 |
| 2,421,810 | 6/1947 | Simpson . | |
| 2,518,988 | 8/1950 | Hartley | 251/16 |
| 2,664,106 | 12/1953 | Livers | 251/16 |
| 3,880,398 | 4/1975 | Rubrich | 251/16 |
| 4,465,093 | 8/1984 | Gold | 137/498 |
| 4,655,245 | 4/1987 | Gellerson | 137/493 |
| 4,699,166 | 10/1987 | Gold | 137/2 |
| 4,962,786 | 10/1990 | Gellerson | 137/493.6 |

*Primary Examiner*—Stephen M. Hepperle
*Attorney, Agent, or Firm*—Alvin S. Blum

[57] ABSTRACT

A fluid fuse is operable to shut off fluid flow only when a certain predetermined volume of fluid has passed through in a single operative cycle. This can then be reset by dropping the inlet pressure. The device protects a hydraulic system from line rupture while automatically resetting after every routine operative cycle when less than the predetermined volume flows. A cylinder has a large diameter bore portion and a small diameter bore portion and holds a sliding piston with large and small diameter segments sealed to respective bore portions by sliding seals. An annular fluid chamber between the seals is reduced in volume as the piston, during fluid flow, moves from a reset position toward a closed position. In the closed position a valve member at the end of the small diameter segment seals off fluid flow as it engages a valve seat at the outlet. Fluid from the annular chamber passes to the outlet through an axial passage in the piston so that the piston may advance. A spring forces the piston back to the reset position from a partial travel position automatically when the outlet pressure is restored at the end of a normal cycle. When rupture of a line occurs, the piston travels to the shut off position from which the spring can reset it only after the inlet pressure is removed.

14 Claims, 1 Drawing Sheet

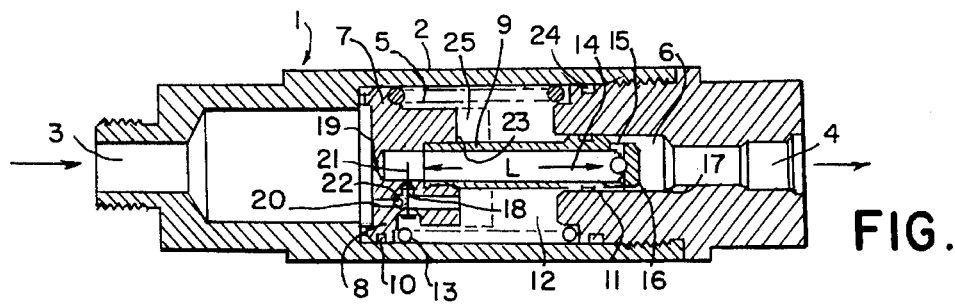
FIG. 1
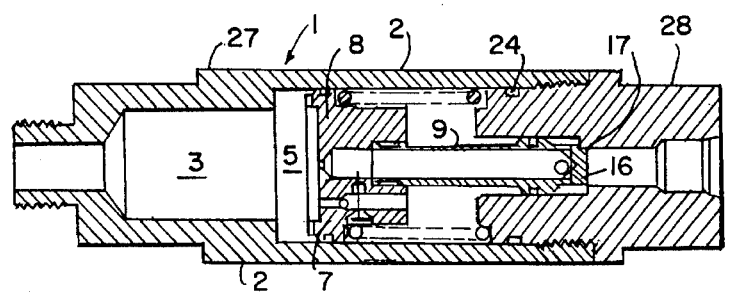
FIG. 2
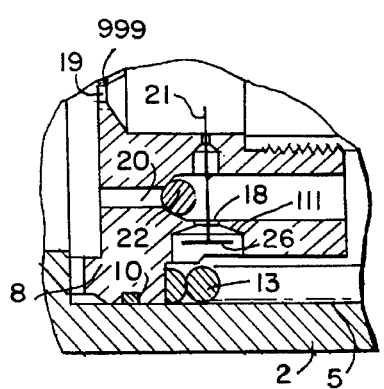
FIG. 3
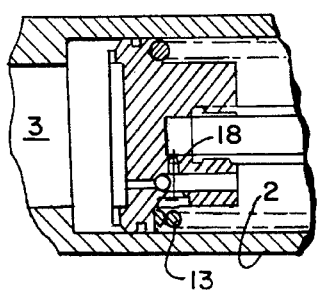
FIG. 5
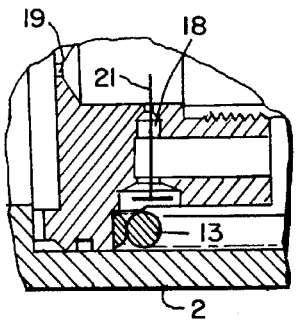
FIG. 4
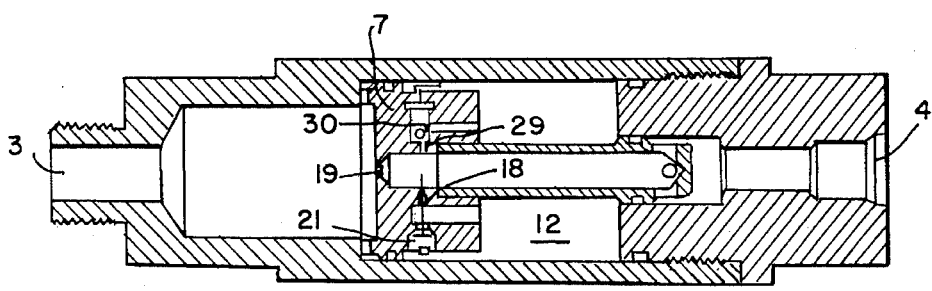
FIG. 6
FIG. 7

VOLUMETRIC HYDRAULIC FUSE VALVE

BACKGROUND OF THE INVENTION

This invention relates to hydraulic fluid control valves, and more particularly to a so-called "fluid fuse" in which the normally open in-line valve is automatically responsive to the passage of a predetermined volume of fluid by closing off the flow.

In certain hydraulic systems, hydraulic fluid is supplied under pressure to one or more hydraulic actuators. Each actuator may be supplied with an in-line control valve. Each actuator may require only a certain maximum volume of hydraulic fluid for full motion. The actuator, its control valve or the connecting lines may rupture or leak. This could cause dangerous release of hydraulic fluid and depressurizing of the entire hydraulic system. To prevent this from happening, it is desirable to be able to automatically seal off the line from the fluid pressure source. It is useful to have a safety shut off valve or hydraulic fuse which can be adjusted to shut off when a predetermined volume of fluid has passed. It should be automatically resettable so that smaller volumes can pass through repeatedly without accumulating on the metering mechanism, but should remain closed once it has been actuated until the pressure at the source has been removed to permit the device to reset.

SUMMARY OF THE INVENTION

It is accordingly an object of the invention to provide a hydraulic fuse valve that will automatically shut off when a predetermined volume of fluid has passed therethrough. It is another object to provide such a valve which automatically resets itself when a lesser volume has passed therethrough and flow has ceased. It is yet another object that the valve remain closed once it has sealed until the source pressure is released.

The fuse valve of the invention comprises a piston slidably sealed within a cylinder. The cylinder has hydraulic line connectors at inlet and outlet. The piston has a large diameter cylindrical rear portion adjacent the inlet and an elongate small diameter forward portion terminated in a poppet valve face for sealing against a valve seat at the cylinder outlet. Both the rear portion and the forward portion of the cylinder have sliding seals for sealingly engaging corresponding large and small diameter cylindrical passage portions of the cylinder defining an annular chamber of variable volume between the seals. An annular spring within this chamber forces the piston to a fully open position away from the outlet. An axial passage within the piston communicates through radial holes, at the outlet end past the seal and before the valve face, with the outlet. This axial passage communicates, at the inlet end of the piston, with the inlet through a narrow orifice and with the annular chamber through a radial passage with a narrow orifice.

When the system is bled of air and fully pressurized, the piston is spring biased to the inlet. When pressure is reduced at the outlet by opening of an actuator valve, the piston is forced toward the outlet. Piston movement reduces the volume of the annular chamber. The fluid in the annular chamber is forced through the radial passage, into the axial passage within the piston, out the exit hole at the poppet end and into the outlet. This movement continues until the actuator valve closes, causing the outlet pressure to rise and pressure on both ends of the piston to equalize. The spring will then return the piston from the partial travel position to the original position while refilling the annular chamber. If the outlet pressure fails to restore, as when a line ruptures, the piston continues to travel to the outlet, forcing fluid out of the annular chamber, until the poppet seals in the seat at the cylinder outlet, thereby shutting off the hydraulic fluid pressure. The piston remains in this position until the inlet pressure is released, whereupon the fuse resets.

These and other objects, advantages and features of the invention will become more apparent when the detailed description is considered in conjunction with the drawings.

BRIEF DESCRIPTION OF THE DRAWINGS

FIG. 1 is a cross sectional view of a fuse valve of the invention in the reset position.

FIG. 2 is a cross sectional view as in FIG. 1 in the shut off position.

FIG. 3 is an enlarged detail of a portion of FIG. 1.

FIG. 4 is an enlarged cross sectional detail of another embodiment of the invention.

FIG. 5 is an enlarged cross sectional detail of another embodiment of the invention.

FIG. 6 is a cross sectional view of another embodiment of the invention.

FIG. 7 is a sectional view of two second segments of different lengths.

DETAILED DESCRIPTION OF PREFERRED EMBODIMENTS

Referring now first to FIGS. 1–3, the hydraulic fluid fuse valve 1 comprises a housing 2 with a high pressure hydraulic fluid source input 3 at a first end and an outlet 4 at a second end for connection to a hydraulic control and actuator of the type well known in the art (not shown). In fluid communication with the inlet and outlet is a cylindrical bore comprised of a large diameter first cylindrical portion 5 and a small diameter second cylindrical portion 6.

A piston 7 is slidably mounted within, and coaxial with, the cylindrical bore for axial translatory motion between the reset position of FIG. 1 and a shut off position shown in FIG. 2. The piston comprises a large diameter first cylindrical segment 8 arranged for a sliding fit to the large diameter portion 5 and an elongate, small diameter second cylindrical segment 9 screw fitted onto the first segment, for a sliding fit within small diameter portion 6 of the bore. A first sliding seal 10 and a second sliding seal 11 seal the two segments to their bore portions and define an annular fluid chamber 12 whose volume will be reduced as the piston advances from its first or reset position.

At the terminus of second segment 9 is a valve member 16 which cooperates with valve seat 17 at the outlet to shut off flow when they meet at the shut off position of FIG. 2. An elongate passage 14 extends axially within the piston as shown in FIGS. 1, 2, 6, without restriction or constriction therein. A plurality of radial exit passages between the seal 11 and valve member 16 communicates between axial passage 14 and outlet 4 until the valve member 16 seals in seat 17. The annular chamber 12 is in fluid communication with the axial passage 14 through channel 18 and the inlet 3 is in fluid communication with the axial passage 14 through constricted orifice 19. Compression spring 13 forces the piston to the reset position shown in FIG. 1 when pressure at inlet and outlet is equal. When a control valve to an actuator opens, pressure at the outlet 4 drops and the piston is forced to the right by inlet pressure. Because the fluid in chamber 12 is not compressible, it must be forced out as the piston advances. The fluid in chamber 12 is forced out through channel 18, axial passage 14 and radial exit passages 15 to outlet 4. This process continues until the valve member 16 seals in seat 17 at the shut off position of FIG. 2, at which time the volume 25 shown in phantom will have been displaced from chamber 12. The fuse cannot shut off until this volume has been displaced. The fuse valve is arranged to only move part way between the reset and shut off positions in normal operation when the actuator control valve is opened long enough for the actuator to perform its function. When the actuator control valve again closes, pressure at outlet 4 rises to the inlet pressure, movement of the piston stops at the partial travel position, and spring 13 forces the piston back to the reset position. This resetting action may take some time, because fluid must flow from inlet 3 through orifice 19 and channel 18 to refill the annular chamber 12. If the fuse must be reset promptly because another actuation must be performed after a brief time interval, then another, faster, refill mechanism may be required. This is provided by the one way fluid connection 20 between inlet 3 and chamber 12. Check valve 22 permits flow into the chamber but prevents flow out of the chamber. This is also helpful for bleeding air from the system. As best seen in FIG. 3, a pin 21 with an open head 26 may be provided in channel 18 to narrow the channel and to keep the channel clear. Flow through the channel causes the pin to vibrate, thereby removing obstructing contaminants.

In normal operation the piston will move part way to shut off, stop and then reset before another call is made for fluid flow. However if there is a demand for an excessive volume of fluid, such as by a rupture of the like, the piston will travel to the shut off position of FIG. 2 and no more fluid will flow until inlet pressure is reduced, enabling the spring to force the piston back to the reset position.

The housing 2 is made in two pieces 27, 28 and sealed at fixed seal 24 so that leakage to atmosphere is readily prevented. It is more difficult to completely seal sliding seals that are in frequent operation. The fuse device with sliding seals 10 and 11 is quite tolerant of sliding seal leakage because any leakage fluid is promptly recirculated.

The actual volume of fluid that will flow before shut off is related to the relative fluid resistances of orifice 19 and channel 18 and the length of segment 9 of the piston. It is well known in the hydraulic art to alter fluid resistance of an orifice or channel by changing its diameter. If the diameter of orifice 19 is increased (phantom lines 999), then its fricitional resistance is reduced. If the diameter of channel 18 is increased (phantom lines 111), then its frictional resistance is reduced. Segment 9 may be replacable by segments of different lengths such as second segments 9 of FIG. 7 having lengths of $L_1$ or $L_2$ as required for different cut off volumes, since it is screw fitted to the rest of the piston.

As best seen in FIG. 5, there may be no orifice 19. In this case, the volume metered to cut off will be equal to the volume 25 shown in phantom in FIG. 1 which is the volume displaced by the piston when moved from reset to cut off positions.

When a fast reset is not required, then the fluid connection 20 with check valve 22 may be eliminated as shown in FIG. 4.

The hydraulic fuse valve of FIG. 6 is useful in systems employing reverse hydraulic flow for resetting between normal actuations.

Instead of a bias spring, resetting is accelerated by the large resetting passageway 29, provided with check valve 30, for diverting reverse fluid flow into annular chamber 12 as fluid flows from outlet 4 toward inlet 3. Pressure drop across orifice 19 causes piston 7 to return and fluid to fill annular chamber 12 preferentially until piston 7 is reset, whereupon balance of reverse flow goes to inlet 3. This configuration may also be used with a return spring.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

We claim:

1. A hydraulic fuse valve for monitoring the quantity of hydraulic fluid passing through the fuse and then blocking such flow when a predetermined volume of fluid has passed through the valve during a single flow demand interval, the combination comprising:

A) a housing having an inlet at a first end, an outlet at a second end, and an elongate bore in fluid communication therebetween, said bore having a large diameter cylindrical portion at said first end and an elongate, smaller cylindrical diameter portion at said second end;

B) a piston arranged for translatory axial motion within said bore, said piston having a large diameter cylindrical first sediment adapted for a sliding coaxial fit within said large diameter cylindrical portion and a smaller diameter elongate cylindrical second segment adapted for a sliding coaxial fit within said smaller diameter cylindrical portion, said second segment terminating in a valve member;

C) a first sliding seal between said first segment and said large diameter cylindrical portion;

D) a second sliding seal between said second segment and said smaller diameter cylindrical portion;

E) an annular fluid chamber defined by the outer wall of said piston and the inner wall of said bore between said first and second sliding seals;

F) spring bias means for biasing said piston to a first position closest to said first end;

G) a straight and unrestricted elongate passage extending axially within said piston and communicating with at least one radial passage to said outlet, said radial passage being between said second seal and said valve member;

H) a channel means for fluid communication between said elongate passage and said annular fluid chamber, so that, as said piston is forced from said first end toward said second end by a drop in pressure at said outlet and the volume of said chamber is thereby reduced, the excess fluid within said chamber may flow through said channel means, said elongate passage and to the outlet through said radial passage; and I) a valve seat means at said outlet for sealing off said fluid flow when said piston has advanced toward said second end to the point where said valve member has sealed itself in said seat and a predetermined volume of fluid has passed through said valve.

2. The hydraulic fuse valve according to claim 1 further comprising a first orifice means in said piston for fluid communication between said elongate passage and said inlet.

3. The hydraulic fuse valve according to claim 2 further comprising a fluid connection in said piston between said inlet and said fluid chamber, said fluid connection provided with check valve means for permitting flow from said inlet to said chamber and preventing flow in the reverse direction for quick resetting of said piston from a partial travel position to said first position.

4. The hydraulic fuse valve according to claim 3 further comprising vibratory orifice cleaning means within said channel means for vibrating when fluid passes to dislodged contaminants within said channel means, and to reduce flow in said channel means.

5. The hydraulic fuse valve according to claim 4, in which said second segment may be replaced by another second segment of a different length to thereby change the volume of fluid which must pass before the valve shuts off.

6. The hydraulic fuse valve according to claim 5, in which said spring bias means is arranged to force said piston to said first position when the hydraulic fluid pressure at said outlet returns to the hydraulic fluid pressure at said inlet after said piston has traveled only a portion of the distance to the point at which said valve member has sealed itself off and to not force said piston toward said first position when said inlet pressure is maintained and said valve member has sealed itself off.

7. The hydraulic fuse valve according to claim 4, in which said spring bias means is arranged to force said piston to said first position when the hydraulic fluid pressure at said outlet returns to the hydraulic fluid pressure at said inlet after said piston has traveled only a portion of the distance to the point at which said valve member has sealed itself off and to not force said piston toward said first position when said inlet pressure is maintained and said valve member has sealed itself off.

8. The hydraulic fluid fuse valve according to claim 2, in which said second segment may be replaced by another second segment of a different length to thereby change the volume of fluid which must pass before the valve shuts off.

9. The hydraulic fluid fuse valve according to claim 2, in which said first orifice and said channel means may be provided with a different frictional resistance to thereby change the volume of fluid which must pass before the valve shuts off.

10. A hydraulic fuse valve for monitoring the quantity of hydraulic fluid passing through the fuse and then blocking such flow when a predetermined volume of fluid has passed through the valve during a single flow demand interval, the combination comprising:

A) a housing having an inlet at a first end, an outlet at a second end, and an elongate bore in fluid communication therebetween, said bore having a large diameter cylindrical portion at said first end and an elongate, smaller cylindrical diameter portion at said second end;

B) a piston arranged for translatory axial motion within said bore, said piston having a large diameter cylindrical first segment adapted for a sliding coaxial fit within said large diameter cylindrical portion and a smaller diameter elongate cylindrical second segment adapted for a sliding coaxial fit within said smaller diameter cylindrical portion, said second segment terminating in a valve member;

C) a first sliding seal between said first segment and said large diameter cylindrical portion;

D) a second sliding seal between said second segment and said smaller diameter cylindrical portion;

E) an annular fluid chamber defined by the outer wall of said piston and the inner wall of said bore between said first and second sliding seals;

F) a straight and unrestricted elongate passage extending axially within said piston and communicating with at least one radial passage to said outlet, said radial passage being between said second seal and said valve member;

G) a channel means for fluid communication between said elongate passage and said annular fluid chamber, so that, as said piston is forced from said first end toward said second end by a drop in pressure at said outlet and the volume of said chamber is thereby reduced, the excess fluid within said chamber may flow through said channel means, said elongate passage and to the outlet through said radial passage; and H) a valve seat means at said outlet for sealing off said fluid flow when said piston has advanced toward said second end to the point where said valve member has sealed itself in said seat and a predetermined volume of fluid has passed through said valve;

I) a first orifice means in said piston for fluid communication between said elongate passage and said inlet; and J) a reset passageway providing one way fluid communication from said elongate passage to said annular fluid chamber for refilling said chamber with reverse flow fluid as said piston is reset by reverse flow from said outlet to said inlet.

11. The hydraulic fuse valve according to claim 10 further comprising vibratory orifice cleaning means within said channel means for vibrating when fluid passes to dislodged contaminants within said channel means, and to reduce flow in said channel means.

12. The hydraulic fuse valve according to claim 10, in which said second segment may be replaced by another second segment of a different length to thereby change the volume of fluid which must pass before the valve shuts off.

13. The hydraulic fluid valve according to claim 10, in which said first orifice and said channel means may be provided with variable frictional resistance to thereby change the volume of fluid which must pass before the valve shuts off.

14. A hydraulic fuse valve for monitoring the quantity of hydraulic fluid passing through the fuse and then blocking such flow when a predetermined volume of fluid has passed through the valve during a single flow demand interval, the combination comprising:

A) a housing having an inlet at a first end, an outlet at a second end, and an elongate bore in fluid communication therebetween, said bore having a large diameter cylindrical portion at said first end and an elongate, smaller cylindrical diameter portion at said second end;

B) a piston arranged for translatory axial motion within said bore, said piston having a large diameter cylindrical first segment adapted for a sliding coaxial fit within said large diameter cylindrical portion and a smaller diameter elongate cylindrical second segment adapted for a sliding coaxial fit within said smaller diameter cylindrical portion, said second segment terminating in a valve member;

C) a first sliding seal between said first segment and said large diameter cylindrical portion;

D) a second sliding seal between said second segment and said smaller diameter cylindrical portion;

E) a straight and unrestricted annular fluid chamber defined by the outer wall of said piston and the inner wall of said bore between said first and second sliding seals;

F) an elongate passage extending axially within said piston and communicating with at least one radial passage to said outlet, said radial passage being between said second seal and said valve member;

G) a channel means for fluid communication between said elongate passage and said annular fluid chamber, so that, as said piston is forced from said first end toward said second end by a drop in pressure at said outlet and the volume of said chamber is thereby reduced, the excess fluid within said chamber may flow through said channel means, said elongate passage and to the outlet through said radial passage; and H) a valve seat means at said outlet for sealing off said fluid flow when said piston has advanced toward said second end to the point where said valve member has sealed itself in said seat and a predetermined volume of fluid has passed through said valve.

* * * * *